United States Patent
Lerner et al.

(10) Patent No.: US 8,434,392 B1
(45) Date of Patent: May 7, 2013

(54) WIRELESS SENSOR AND MONITORING SYSTEM

(75) Inventors: Andrew J. Lerner, Houston, TX (US); Daniel M. Lerner, Missouri City, TX (US); Mitch R. Demny, Magnolia, TX (US); John M. Prutzman, Hockley, TX (US)

(73) Assignee: Virtual Dial Indicator, LLC., Houston, TX (US)

( * ) Notice: Subject to any disclaimer, the term of this patent is extended or adjusted under 35 U.S.C. 154(b) by 413 days.

(21) Appl. No.: 12/888,486

(22) Filed: Sep. 23, 2010

Related U.S. Application Data

(60) Provisional application No. 61/277,341, filed on Sep. 24, 2009.

(51) Int. Cl.
*G01B 7/12* (2006.01)
*G05B 19/402* (2006.01)

(52) U.S. Cl.
USPC .............. 82/1.11; 82/118; 318/572

(58) Field of Classification Search .............. 82/1.11, 82/47, 100, 118, 113; 340/680; 33/561; 318/561, 572; 700/192, 195
See application file for complete search history.

(56) References Cited

U.S. PATENT DOCUMENTS

| | | | |
|---|---|---|---|
| 3,935,766 A | | 2/1976 | Masters |
| 4,130,941 A | * | 12/1978 | Amsbury ................ 33/558 |
| 4,195,250 A | * | 3/1980 | Yamamoto ............... 318/561 |
| 4,203,225 A | * | 5/1980 | Nilsson ................... 33/561 |
| 4,382,215 A | | 5/1983 | Barlow |
| 4,509,266 A | * | 4/1985 | Cusack .................... 33/561 |
| 4,562,392 A | * | 12/1985 | Davis et al. ............... 318/572 |
| 4,610,090 A | * | 9/1986 | Brady ..................... 33/797 |
| 4,864,294 A | * | 9/1989 | Fukuhisa ................. 340/870.01 |
| 5,001,464 A | * | 3/1991 | Yuzuru .................... 340/680 |
| 7,034,711 B2 | | 4/2006 | Sakatani |
| 7,259,749 B2 | * | 8/2007 | Schopf .................... 345/158 |
| 2007/0159161 A1 | | 7/2007 | Neill |

OTHER PUBLICATIONS http://www.starrett.com/pages/1594_datasure_wireless_data_collection.cfm; The L.S. Starrett Company; Athol, MA.

* cited by examiner

*Primary Examiner* — Will Fridie, Jr.
(74) *Attorney, Agent, or Firm* — Neustel Law Offices

(57) ABSTRACT

A sensor and monitoring system for performing work upon an inner diameter of a machined workpiece, such as a pipe turned by a lathe, with the work being viewed and/or recorded remotely. The system includes a sensing device having an elongated rod, at least one sensor mounted to a first end of the rod, and a power supply and a transceiver mounted to a second end of the rod, the sensor being positioned within the bore of the workpiece for performing work upon the inner diameter and the transceiver and power supply positioned external to the bore. A controller device is wirelessly connected to the transceiver for wirelessly receiving and sending communication signals to and from the sensor via the transceiver. The sensor may of various types, such as a linear touch probe, a distance sensing laser, a temperature, vibration, gas, noise, or ultrasonic sensor, or a camera.

20 Claims, 7 Drawing Sheets

WIRELESS SENSOR AND MONITORING SYSTEM

CROSS REFERENCE TO RELATED APPLICATIONS

I hereby claim benefit under Title 35, United States Code, Section 119(e) of United States provisional patent application Ser. No. 61/277,341 filed Sep. 24, 2009. The 61/277,341 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a sensor and more specifically it relates to a wireless sensor and monitoring system for performing work upon an inner diameter of a machined workpiece, such as a pipe turned by a lathe, with the work being viewed and/or recorded remotely.

2. Description of the Related Art

Any discussion of the related art throughout the specification should in no way be considered as an admission that such related art is widely known or forms part of common general knowledge in the field.

Machine tool measurements are typically done with mechanical instruments which must be directly viewed. In many instances, it is very inconvenient to directly view the instruments because the location being measured is physically hidden, such as the middle of a pipe bore. Further, the measurement may need to be taken while the machine is operating, which can be increasingly difficult and may be dangerous when directly viewing the instrument. Because of the inherent problems with the related art, there is a need for a new and improved wireless sensor and monitoring system for measuring, viewing, or otherwise sensing an interior of a machined piece, such as pipe, with the measurement, image, etc. being viewed and/or recorded remotely of the machined piece.

BRIEF SUMMARY OF THE INVENTION

A system for performing work upon an inner diameter of a machined workpiece, such as a pipe turned by a lathe, with the work being viewed and/or recorded remotely. The invention generally relates to a sensing and measuring device which includes a sensing device having an elongated rod, at least one sensor mounted to a first end of the rod, and a power supply and a transceiver mounted to a second end of the rod, the sensor being positioned within the bore of the workpiece for performing work upon the inner diameter and the transceiver and power supply positioned external to the bore. A controller device is wirelessly connected to the transceiver for wirelessly receiving and sending communication signals to and from the sensor via the transceiver. The sensor may of various types, such as a linear touch probe, a distance sensing laser, a temperature, vibration, gas, noise, or ultrasonic sensor, or a camera.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
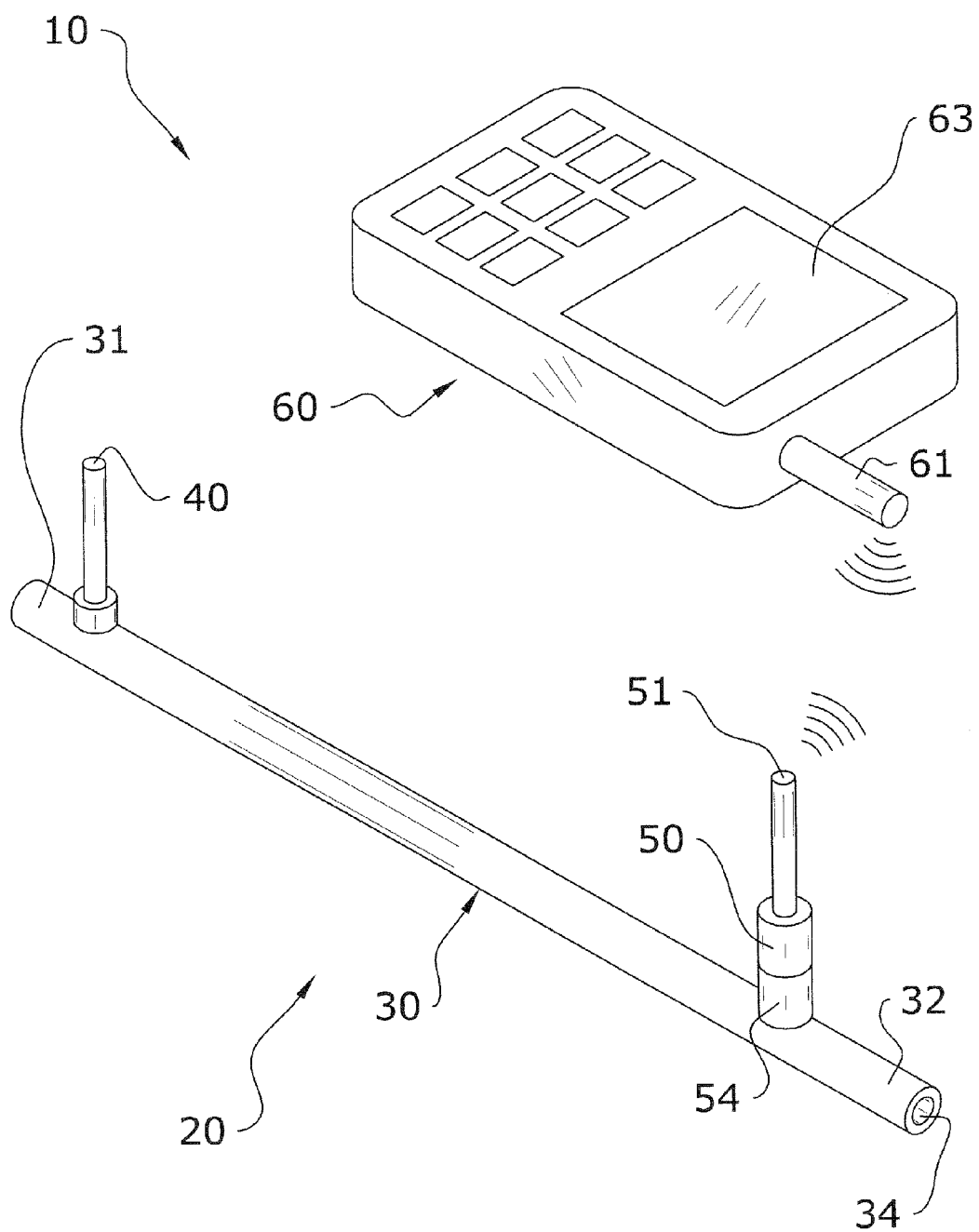
FIG. 1 is an exemplary upper perspective view of the present invention.
Figure 2:
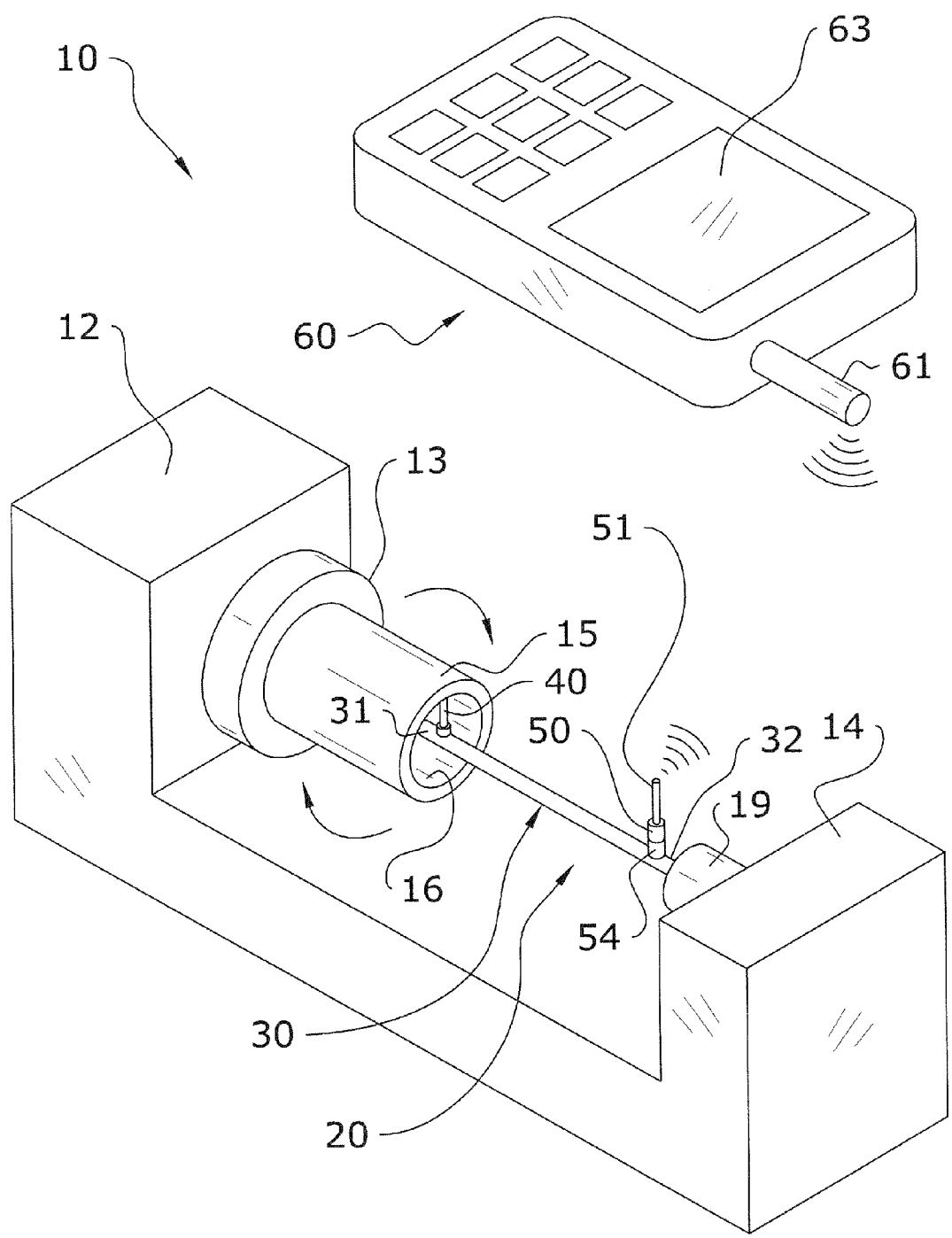
FIG. 2 is an exemplary upper perspective view of the present invention with the sensor device positioned within a workpiece.

A. Overview.

Turning now descriptively to the drawings, in which similar reference characters denote similar elements throughout the several views, FIGS. 1 through 7 illustrate a wireless sensor and monitoring system 10, which comprises a sensing device 20 having an elongated rod 30, at least one sensor 40, 40', 40" mounted to a first end 31 of the rod 30, and a power supply 54 and a transceiver 50 mounted to a second end 32 of the rod 30, the sensor 40 being positioned within the bore 16 of the workpiece 15 for performing work upon the inner diameter and the transceiver 50 and power supply 54 positioned external to the bore 16. A controller device 60 is wirelessly connected to the transceiver 50 for wirelessly receiving and sending communication signals to and from the sensor 40 via the transceiver 50. The sensor 40 may of various types, such as a linear touch probe, a distance sensing laser, a temperature, vibration, gas, noise, or ultrasonic sensor, or a camera. The sensing device 20 or controller device 60 could also be used in coordination with other sensors, controllers, machines, or other components, such as in a network as appreciated.

B. Turning Machine and Workpiece.

Various types of turning machines 12 may be used to turn the workpiece 15. Generally, a lathe 12 is utilized; however it is appreciated that the present invention may be used with various types of turning machines, such as a mill. The turning machine 12 generally includes a chuck 13 or other holding structure to hold and support the workpiece 15 while the workpiece 15 is turned and a cross-draw 14 to support the sensing device 20, such as through various types of clamps 19. The workpiece 15 generally has a bore 16 which defines an inner diameter of the workpiece 15, the workpiece 15 generally being comprised of a cylindrical shape. It is appreciated however that the sensing device 20 and controller device 60 may be used with workpieces 15 not supported or used in combination with a turning machine 12.

C. Sensing Device.

The sensing device 20 is used to measure the inner diameter of the workpiece 15 while the workpiece 15 is stationary or while the workpiece 15 is being turned and more particularly for measuring eccentricity of the workpiece 15 and/or to make adjustments to the lathe 12 to minimize eccentricity. The sensing device 20 is supported parallel to the linear axis of the workpiece 15 and partially extends within the bore 16 of the workpiece 15. A portion of the workpiece 15 is also supported so that the sensing device 20 remains substantially stationary while the workpiece 15 is turned or while taking measurements. Different types of supporting structures may be utilized as necessary, such as clamps 19, etc. attaching the sensing device 20 to the cross-draw 14 of the lathe 12. The cross-draw 14 may be used to make fine-tune or substantial adjustments to the positioning of the sensing device 20 relative the workpiece 15.

The sensing device 20 generally includes the elongated rod 30, the elongated rod 30 being generally straight and rigid in structure. The elongated rod 30 is comprised of a strong material, such as metal, aluminum, steel, carbon fiber composite, etc. to prevent any bending of the elongated rod 30 due to the weight of the sensor 40 or the transceiver 50 and power supply 54. The first end 31 of the elongated rod 30 is positioned within bore 16 of the workpiece 15 during use and the second end 32 of the elongated rod 30 is generally external to the bore 16 of the workpiece 15. The elongated rod 30 also is preferably hollow thus having an elongated channel 34 extending therethrough along a linear axis.

The sensor 40 is mounted to the first end 31 of the elongated rod 30 and is generally used to measure linear displacement of the inner diameter of the workpiece 15; however other criteria may be measures as appreciated. The sensor 40 is generally oriented perpendicular to the linear axis of the elongated rod 30 to sense or take measurements perpendicular to the elongated rod 30, such as along the inner diameter of the workpiece 15. The sensor 40 may be fixed to the elongated rod 30 or move along a linear axis of the elongated rod 30, such as when taking measurements. Various structures or assemblies may be utilized to move the sensor 40 along the linear length of the elongated rod 30 as appreciated.

Figure 7:
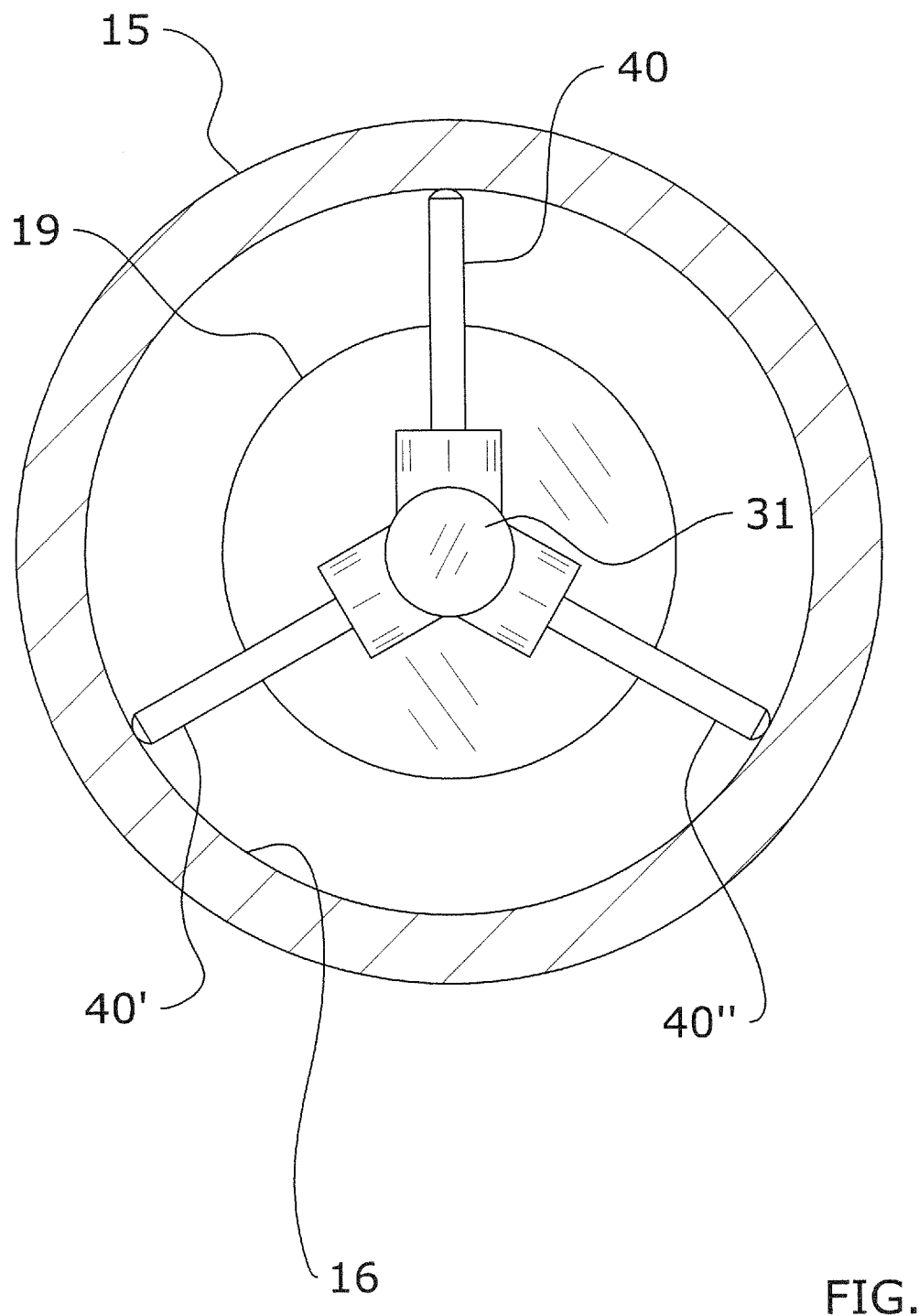
FIG. 7 is an exemplary end view of the sensing device positioned within the workpiece, the sensing device having three equal-spaced sensors.

The sensing device 20 may also include two or more sensors 40, 40', 40". The second sensor 40' is generally oriented in an opposite direction as the first sensor 40, yet still perpendicular to the elongated rod 30 and if the third sensor 40" is utilized, the sensors 40, 40', 40" are also equally spaced around the elongated rod 30. Alternately, FIG. 7 illustrates sensors 40, 40', 40" spaced apart along a linear axis of the rod 30 for simultaneously measuring different parts of the workpiece 15. The sensors 40, 40', 40" may adjust (inwardly or outwardly) or move (linearly or rotationally) as needed and may be comprised of different or similar types.

Various types of sensors may be utilized, such as but not limited to a linear touch probe (e.g. LVDT type), a dial indicator, a distance sensing laser, an optical camera, a light sensor, a temperature sensor, a vibration sensor, a gas sensor, a noise sensor, a material hardness sensor, or an ultrasonic sensor.

Extending from the sensor 40, through the interior channel 34 are wires 48 that connect the sensor 40 to the transceiver 50 and power supply 54 mounted to the second end 32 of the elongated rod 30 external to the bore 16 of the workpiece 15. It is appreciated that in alternate embodiments the sensor 40 may have an antenna for wirelessly communicating with the transceiver 50.

The transceiver 50, generally including an antenna 51, receives signals from the sensor 40 via the wires 48 and wirelessly communicates the same to the controller device 60 through the antenna 51. The transceiver 50 may also wirelessly receive signals from the controller device 60 and communicate the same to the sensor 40 through the wires 48 as appreciated. It is appreciated that the sensor 40 and/or transceiver 50 may include various circuitries as appreciated for proper functionality of the respective components. The signals being sent from the transceiver 50 to the controller device 60 are preferably comprised of radio-type signals (e.g. Wi-Fi, Bluetooth).

Various types of power supplies may be utilized to power both the transceiver 50 and the sensor 40. The power supply 54 may be located external to the elongated rod 30 or internal to the elongated rod 30.

D. Controller Device.

The controller device 60, also generally having an antenna 61, is used to read and record measurements taken from the sensor 40. It is appreciated that the controller device 60 includes an interface 63 (e.g. display, buttons, etc.) which may be used for grouping, analyzing, viewing measurements, and sending command signals back to the sensor 40 via the transceiver 50. The controller device 60 inherently includes the antenna 61 for wirelessly receiving communication signals from the sensor 40 via the transceiver 50. The controller device 60 is also generally comprised of a handheld structure; however other types may be appreciated as well, such as a personal computer or other device having an antenna, interface, and computing hardware. The controller device 60 may also retransmit the signals from the sensor 40 to another computer or network.

E. Operation of Preferred Embodiment.

The present invention may be employed in various embodiments. In a first embodiment, the sensor 40 is comprised of a single, linear touch probe sensor or distance sensing laser. The sensor 40 is mounted to the first end 31 of the elongated rod 30 and positioned perpendicular to the elongated rod 30. The elongated rod 30 is positioned parallel to the center-line axis of the workpiece 15 so that the sensor 40 is able to determine linear change in distance of the inner diameter walls of the workpiece 15. The workpiece 15 may then be rotated about the center-line axis and the sensor 40 will determine run-out or eccentricity as illustrated in FIG. 1.

Figure 3:
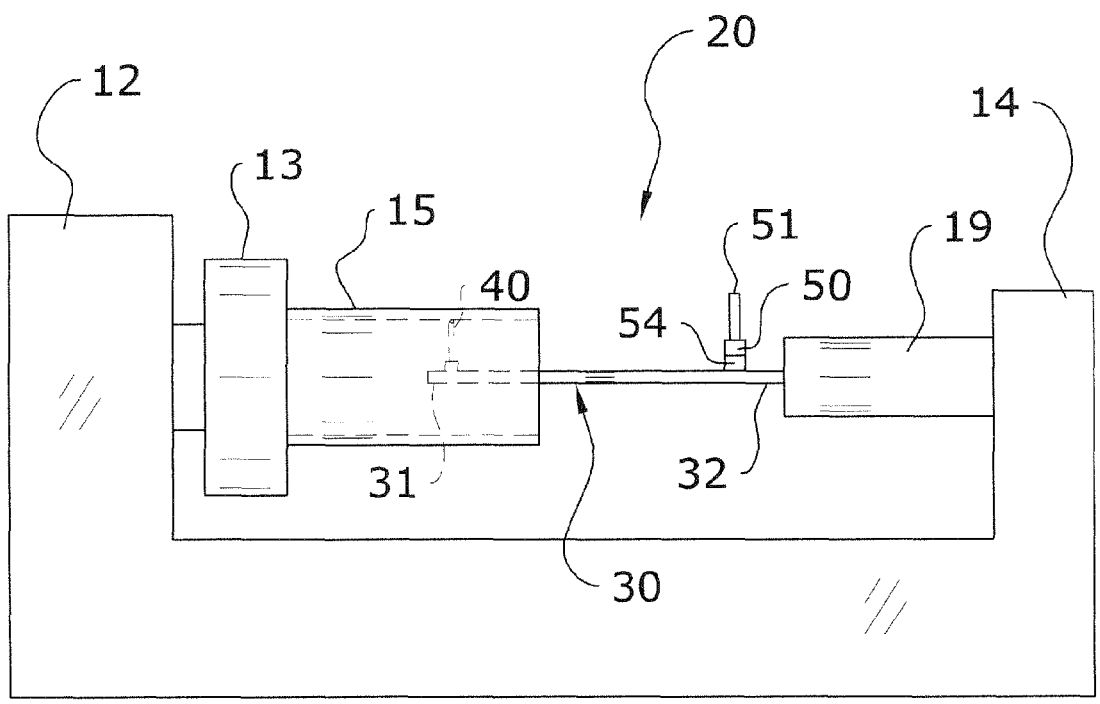
FIG. 3 is an exemplary side view of the sensing device secured in position by the lathe.
Figure 4:
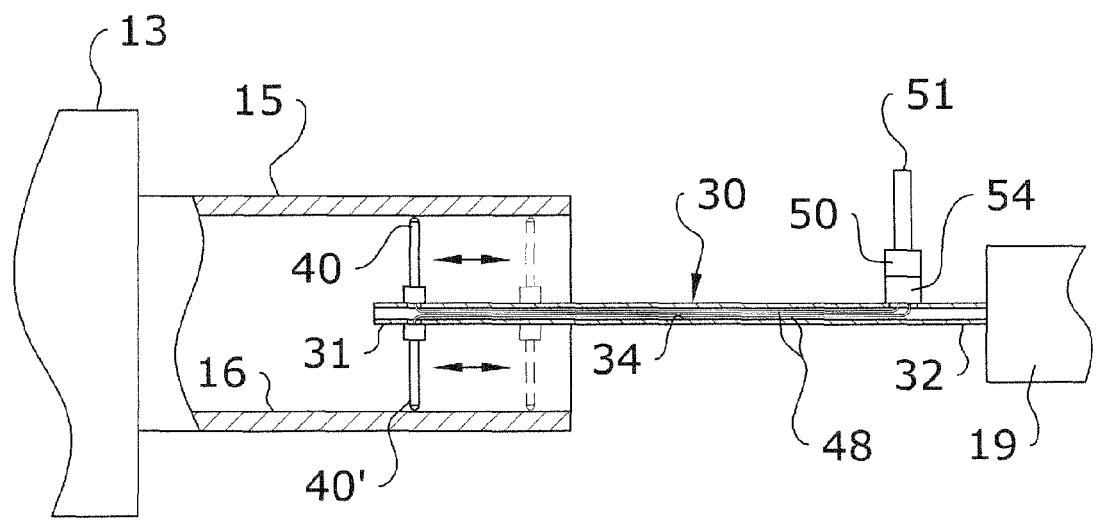
FIG. 4 is an exemplary side view of the sensing device secured in position by the lathe and the sensors moving along the linear axis of the elongated rod.
Figure 5:
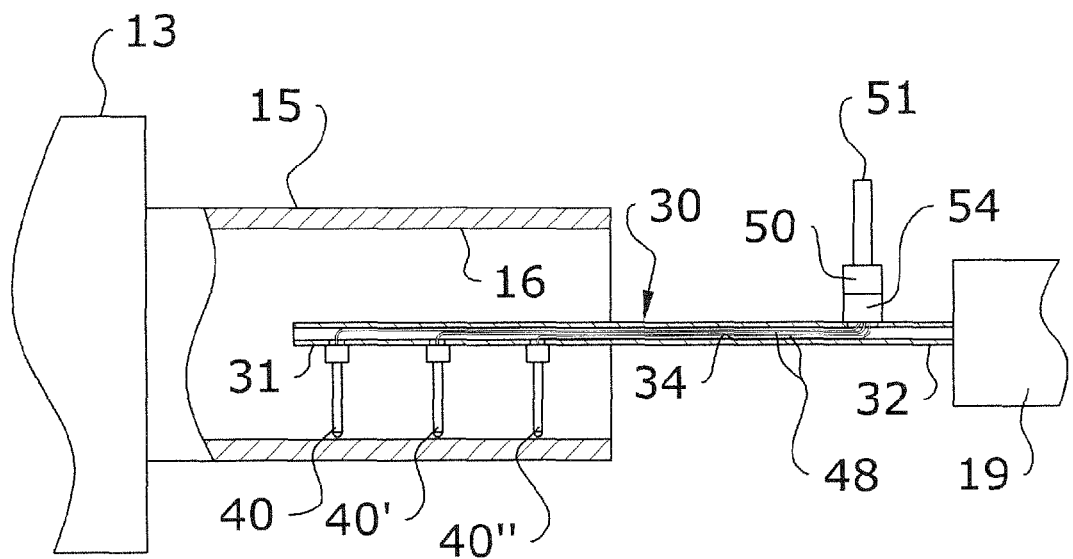
FIG. 5 is an exemplary side view of the sensing device secured in position by the lathe and having multiple spaced-apart sensors.
Figure 6:
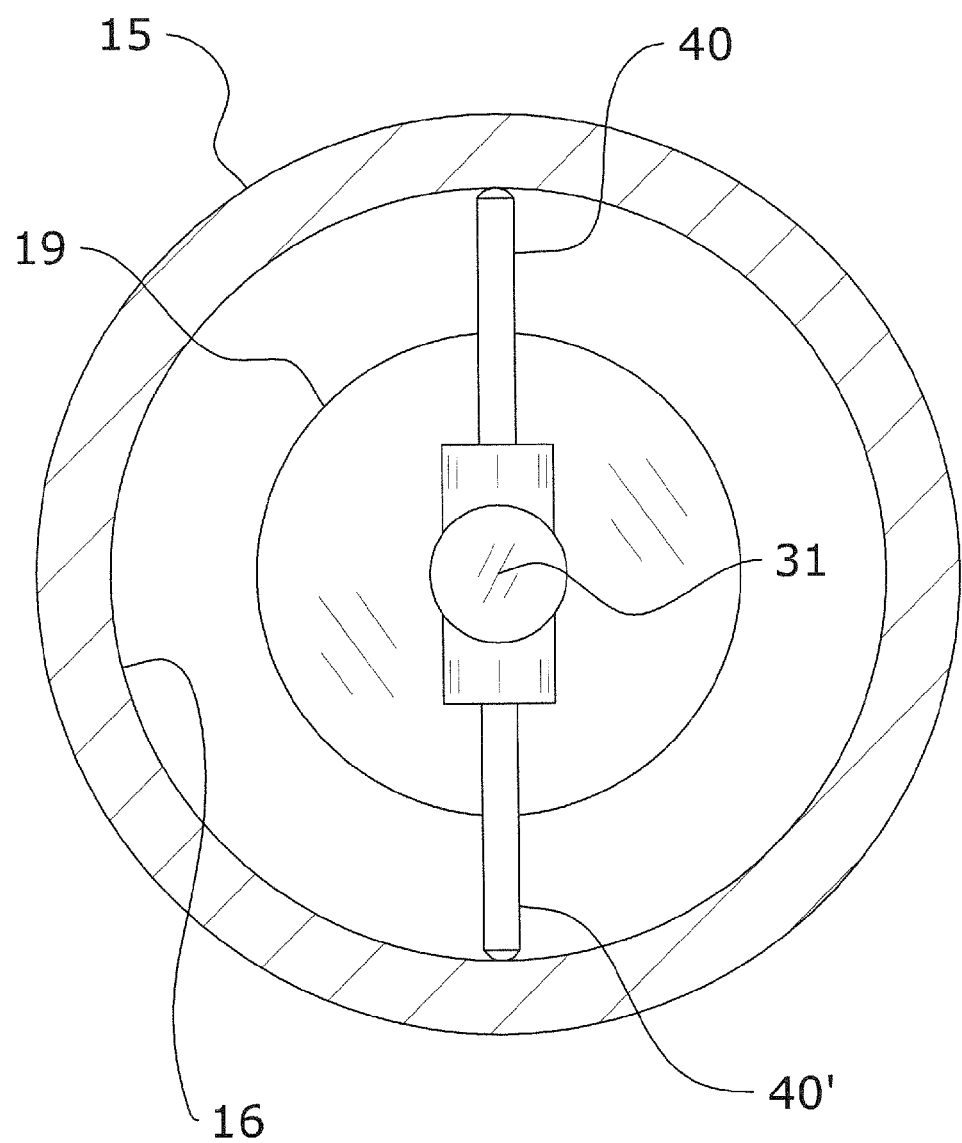
FIG. 6 is an exemplary end view of the sensing device positioned within the workpiece, the sensing device having two equal-spaced sensors.

In a second embodiment, two or more opposing, linear touch probe sensors or distance sensing lasers are utilized for sensors 40, 40'. The sensors 40, 40' are mounted to the first end 31 of the elongated rod 30 and positioned perpendicular to the elongated rod 30 in opposing directions. The elongated rod 30 is positioned parallel to the center-line axis of the workpiece 15 so that the sensors 40, 40' are able to determine linear change in distance of the inner diameter walls of the workpiece 15. The workpiece 15 may then be rotated about the center-line axis and the sensors 40, 40' will determine run-out or eccentricity, as well as the diameter of the workpiece 15. The sensors 40, 40' may also be moved along the linear axis of the workpiece 15 while the workpiece 15 is stationary and drift of the center-line of the workpiece 15 will be determined as well as changes in the inner diameter via moving the sensors 40, 40' linearly along the length of the elongated rod 30 as illustrated in FIG. 3. It is appreciated that the sensors 40, 40' may be adjusted in various other manners with respect to the elongated rod 30.

In a third embodiment, the sensor(s) 40 may be used as an inner diameter mapping device to create a three-dimensional CAD computer file, wherein the sensor(s) 40 are mounted in a similar manner as the first and second embodiments and the elongated rod 30 is positioned similarly. The workpiece 15 is then rotated as the sensor(s) 40 is run down the center-line of the workpiece 15 at a fixed rate. The laser comprised sensor(s) 40 will measure changes in distance of the inner walls of the workpiece 15 at a high resolution and the recorded measurements may be compiled into a bit map three-dimensional image of the workpiece 15 and converted to any industry standard CAD software file.

In another embodiment, the sensor 40 may comprise an optical camera or light sensor. The sensor 40 senses light in such a way that an accurate image may be formed. Multiple optical sensors 40 that can utilize all the different frequencies or the light spectrum may be used. The sensor(s) 40 in this embodiment are likewise mounted to the first end 31 of the elongated rod 30 for viewing the inner diameter.

Other types of sensors 40, such as temperature, vibration, gas, noise, or ultrasonic may also be utilized in similar manners to perform similar or other types of work upon the inner diameter of the workpiece 15.

In all embodiments, the recorded signals from the sensor(s) 40 is sent to the transceiver 50 for being wirelessly relayed to the controller device 60 for being read, modified, stored, displayed, etc. Additionally, the controller device 60 may wirelessly send signals to the transceiver 50 for being relayed to the sensor(s) 40. Thus, the operator does not need to be within a line-of-sight for accurately viewing and measuring the inner diameter of the workpiece 15, wherein the operator may view measurements taken from the inner diameter in a remote location via the wireless communication signals sent to the controller device 60. Additionally, it is appreciated that various synchronization processes may be used to connect the transceiver 50 to the controller device 60.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A sensing system for performing and monitoring work on an inner diameter defined by a bore of a workpiece, comprising:
    an elongated rod having a first end and a second end, said first end located within said bore of said workpiece and said second end located external to said bore;
    a sensing means mounted to said first end of said elongated rod, said sensing means for performing work upon said inner diameter of said workpiece;
    a transceiver mounted to said second end of said elongated rod, said transceiver communicatively connected to said sensing means;
    a power means connected to said sensing means and said transceiver for providing power thereto; and
    a controller means wirelessly connected to said transceiver for wirelessly receiving and sending communication signals to and from said sensing means via said transceiver.

2. The sensing system of claim 1, wherein said sensing means is oriented perpendicular to said elongated rod.

3. The sensing system of claim 1, wherein said sensing means is comprised of a linear touch probe.

4. The sensing system of claim 1, wherein said sensing means is comprised of a distance sensing laser.

5. The sensing system of claim 1, wherein said sensing means is comprised of a camera.

6. The sensing system of claim 1, wherein said sensing means is comprised of temperature, vibration, gas, noise, or ultrasonic sensor.

7. The sensing system of claim 1, wherein said elongated rod is hollow and including electrical wires running through said hollow rod for connecting said sensing means to said transceiver and said power means.

8. The sensing system of claim 7, wherein said power means is mounted to said second end of said elongated rod.

9. The sensing system of claim 1, wherein said sensing means is comprised of a first sensor and a second sensor.

10. The sensing system of claim 9, wherein said first sensor extends in an opposite direction from said elongated rod as said second sensor.

11. The sensing system of claim 1, wherein said first sensor is oriented perpendicular to said elongated rod and wherein said second sensor is oriented perpendicular to said elongated rod.

12. The sensing system of claim 1, wherein said sensing means is comprised of a first sensor, a second sensor, and a third sensor.

13. The sensing system of claim 1, wherein said sensing means is movable along a linear axis of said elongated rod.

14. A system for performing work on an inner diameter of a workpiece, comprising:
    a turning machine having a workpiece mounted thereto, said workpiece turned by said turning machine and said workpiece having a bore extending therein defining an inner diameter of said workpiece;
    a sensing device having an elongated rod, a sensor means mounted to a first end of said elongated rod, a power means mounted to a second end of said elongated rod, and a transceiver mounted to said second end of said elongated rod;
    wherein said sensor means and said first end of said elongated rod are positioned within said bore of said workpiece for performing work upon said inner diameter;
    wherein said transceiver, said power means, and said second end of said elongated rod are positioned external to said bore; and
    a controller device wirelessly connected to said transceiver for wirelessly receiving and sending communication signals to and from said sensing means via said transceiver.

15. The sensing system of claim 14, wherein said workpiece is comprised of a tubular structure.

16. The sensing system of claim 14, wherein said turning machine is comprised of a lathe.

17. The sensing system of claim 14, wherein said elongated rod is parallel to a linear axis of said workpiece and wherein said sensing means is oriented perpendicular to said elongated rod.

18. The sensing system of claim 17, wherein said sensing means includes a plurality of sensors, each of said sensors perpendicular to said elongated rod.

19. A method for performing work upon an inner diameter of a workpiece, comprising:
   providing a lathe having a tubular workpiece mounted thereto, said tubular workpiece having a bore extending therein defining an inner diameter of said tubular workpiece;
   providing a sensing device having an elongated rod, a sensor means mounted to a first end of said elongated rod, a power means mounted to a second end of said elongated rod, and a transceiver mounted to said second end of said elongated rod, said sensor means and said first end of said elongated rod are positioned within said bore of said tubular workpiece for performing work upon said inner diameter, and said transceiver, said power means, and said second end of said elongated rod are positioned external to said bore of said tubular workpiece;
   orienting said elongated rod parallel with a linear axis of said tubular workpiece;
   turning said tubular workpiece with said lathe;
   measuring said inner diameter of said tubular workpiece with said sensing means;
   transmitting a signal of said measurement from said sensing means to said transceiver;
   providing a controller device; and
   relaying said signal to said controller device via wireless communication from said transceiver.

20. The method of claim 19, wherein said sensing means is oriented perpendicular to said elongated rod.

\* \* \* \* \*